US006868173B1

(12) United States Patent
Sakai et al.

(10) Patent No.: US 6,868,173 B1
(45) Date of Patent: Mar. 15, 2005

(54) METHOD FOR CONFIRMING AUTHENTICITY OF SHEET

(75) Inventors: Hidetaka Sakai, Katano (JP); Yoshinori Tanabe, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/646,907

(22) PCT Filed: Mar. 14, 2000

(86) PCT No.: PCT/JP00/01554

§ 371 (c)(1), (2), (4) Date: Oct. 10, 2000

(87) PCT Pub. No.: WO00/55819

PCT Pub. Date: Sep. 21, 2000

(30) Foreign Application Priority Data

Mar. 17, 1999 (JP) .......................................... 11-071694

(51) Int. Cl.[7] .................................................. G06K 9/00
(52) U.S. Cl. ....................................................... 382/135
(58) Field of Search .......................................... 382/135

(56) References Cited

U.S. PATENT DOCUMENTS 5,353,905 A * 10/1994 Yokomori ................... 194/317
5,419,423 A * 5/1995 Ishida et al. ................ 194/206
5,615,760 A * 4/1997 Vaks .......................... 194/206
5,757,001 A * 5/1998 Burns .................... 250/339.11
6,014,453 A * 1/2000 Sonoda et al. .............. 382/137
6,125,986 A * 10/2000 Nagase ....................... 194/207
6,327,543 B1 * 12/2001 Nakajima et al. ............. 702/66

FOREIGN PATENT DOCUMENTS

JP 51-90890 A 8/1976
JP 60-215293 A 10/1985
JP 62074188 A 4/1987
JP 04106692 A 4/1992
JP 8-12684 B2 2/1996
JP 10162194 A 6/1998

OTHER PUBLICATIONS

Nakata, "Pattern Recognition and its Application", Japanese Language, pp. 21–28 (8 pgs).

* cited by examiner

*Primary Examiner*—Leo Boudreau
*Assistant Examiner*—Hussein Akhavannik
(74) *Attorney, Agent, or Firm*—Arent Fox PLLC

(57) ABSTRACT

The truth of a paper type to be examined is judged by measuring, with respect to each of true paper types previously prepared, a plurality of types of characteristic amounts by a plurality of types of sensors for each of a plurality of portions for examination previously determined, analyzing principal components on the basis of obtained results of the measurement, to find an equation of straight line corresponding to the predetermined principal component, and producing reference data composed of a value relating to the predetermined principal component for the portion for examination on the basis of the foundation of straight line.

4 Claims, 12 Drawing Sheets

METHOD FOR CONFIRMING AUTHENTICITY OF SHEET

TECHNICAL FIELD

The present invention relates to a method of judging the truth of a paper type such as a bill or a security.

BACKGROUND ART

Known as a method of judging the truth of a bill is a method of judging the truth of a bill to be examined by comparing detection data obtained by a single sensor such as a magnetic sensor from the bill to be examined with reference data previously produced (JP-B-60-215293).

In this method, however, only the data detected by the single sensor is used for judging the truth. If it is judged how sensor is used as the sensor, it is easy to fabricate such a false bill that data which is judged to be a true bill by the sensor is obtained. That is, it is easy to counterfeit a bill.

Therefore, a method of judging the truth of a bill using two types of sensors (see JP-A-51-90890 and JP-A-51-90891). That is, a first sensor for detecting the transmission rate of visible light in a portion to be examined of a bill to be examined and a second sensor for detecting the transmission rate of infrared light in the portion to be examined of the bill to be examined are prepared, and it is judged whether or not the ratio of the detection level of the transmission rate of the visible light detected by the first sensor to the detection level of the transmission rate of the infrared light detected by the second sensor or the difference therebetween is within a predetermined range, to judge the truth of the bill to be examined.

Although this method also uses the two sensors, however, the truth is judged by simple judgment whether or not the difference or the ratio between the detection levels of the sensors is within a predetermined range. If it is judged how sensors are used as the sensors, it is easy to fabricate such a false bill that data which is judged to be a true bill by the sensors is obtained. That is, it is easy to counterfeit a bill.

An object of the present invention is to provide a method of judging the truth of a paper type which is more difficult to counterfeit.

SUMMARY OF THE INVENTION

A method of judging the truth of a paper type according to the present invention is characterized by measuring, with respect to each of true paper types previously prepared, a plurality of types of characteristic amounts by a plurality of types of sensors for each of a plurality of portions for examination previously determined, analyzing principal components on the basis of obtained results of the measurement, to find an equation of straight line corresponding to the predetermined principal component, and producing reference data composed of a value relating to the predetermined principal component for the portion for examination on the basis of the found equation of straight line; measuring, with respect to the paper type to be examined, the plurality of types of characteristic amounts by the plurality of types of sensors for each of the plurality of portions for examination previously determined, and producing data for examination composed of a value relating to the predetermined principal component for the portion for examination on the basis of obtained results of the measurement and the equation of straight line; and comparing the reference data and the data for examination, to judge the truth of the paper type to be examined.

Used as the plurality of types of sensors are two types of sensors, i.e., a magnetic sensor and a light transmission sensor. Used as the plurality of types of sensors are two types of sensors, i.e., a red light transmission sensor and an infrared light transmission sensor. Used as the plurality of types of sensors are three types of sensors, for example, a magnetic sensor, a red light transmission sensor, and an infrared light transmission sensor.

DETAILED DESCRIPTION OF THE INVENTION

Figure 1:
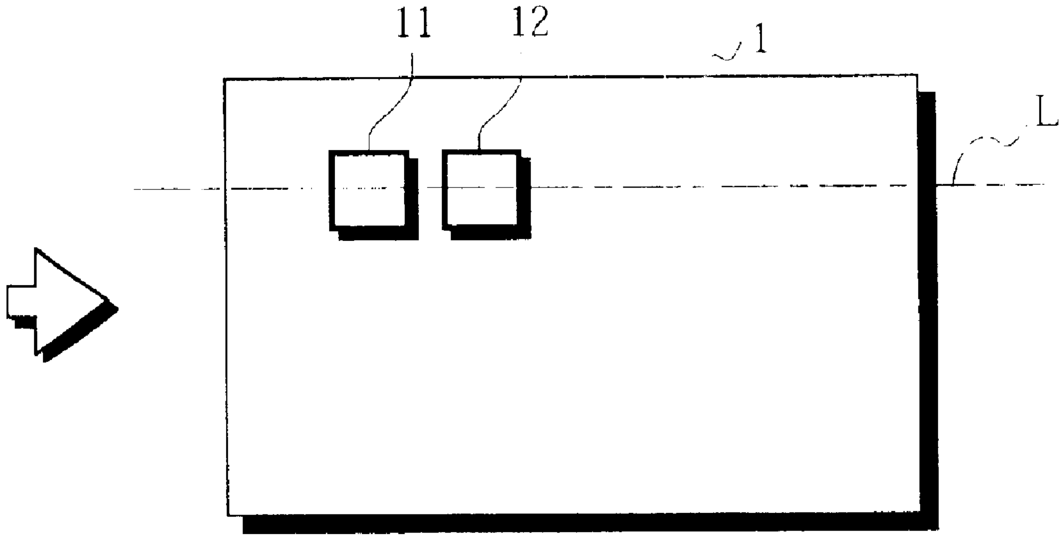
FIG. 1 is a plan view showing a sensor for reading characteristic amounts of a bill.

Referring now to the drawings, embodiments of the present invention will be described.

[1] Description of First Embodiment

[1-1] Description of Sensor for Reading Characteristic Amounts of Bill

FIG. 1 illustrates a sensor for reading characteristic amounts of a bill.

A bill 1 is fed into an examining device (not shown) and is conveyed in a direction indicated by an arrow. As a sensor for reading characteristic amounts of the bill 1, a light transmission sensor 11 and a magnetic sensor 12 are provided.

The light transmission sensor 11 detects the a light transmission rate at a plurality of positions where characteristic amounts are read on a line L in the bill 1. The magnetic sensor 12 detects magnetic field strength at each of the positions where characteristic amounts are read on the line L in the bill 1.

[1-2] Description of Preliminary Processing

In order to judge the truth of a bill, reference data must be produced on the basis of a plurality of true bills previously prepared.

Figure 2:
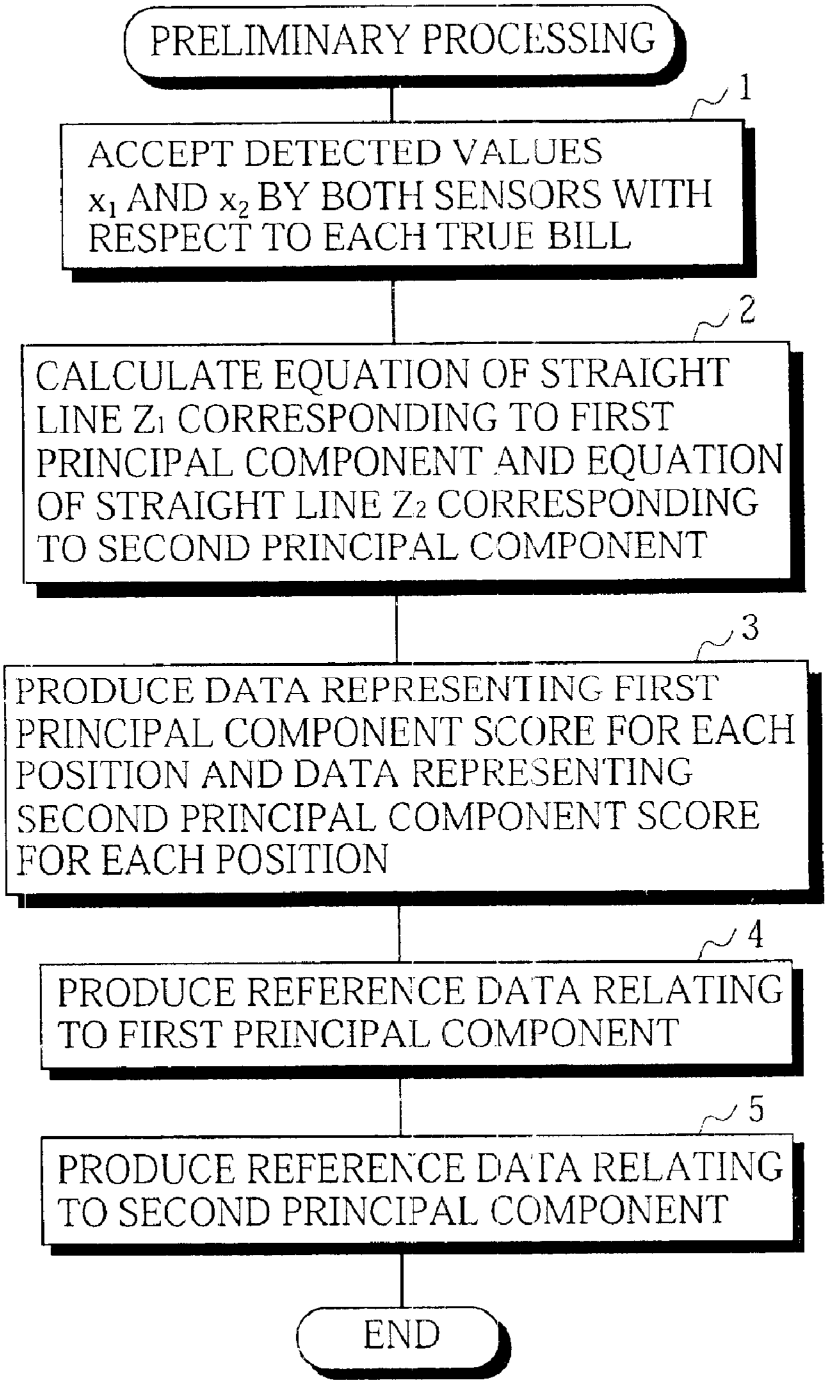
FIG. 2 is a flow chart showing the procedure for preliminary processing for producing reference data.

FIG. 2 shows the procedure for preliminary processing for producing reference data.

(1) A plurality of true bills are previously prepared. With respect to each of the true bills, a detected value $x_1$ by the light transmission sensor 11 and a detected value $x_2$ by the magnetic sensor 12 are accepted for each of a plurality of positions where characteristic amounts are read on a line L (step 1).

Figure 3:
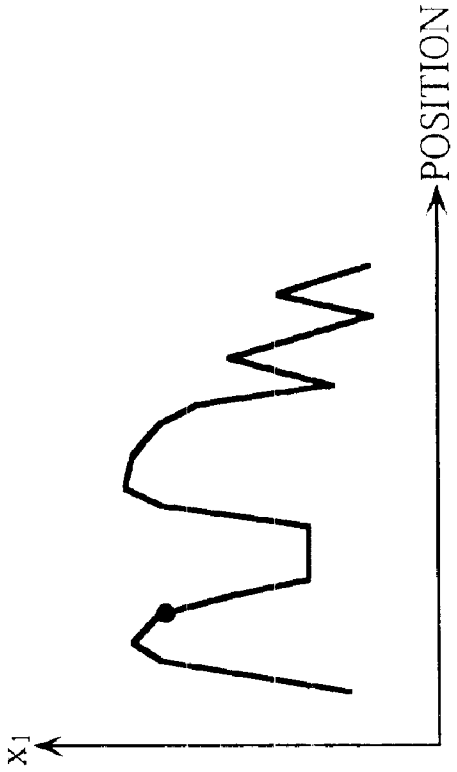
FIGS. 3(*a*) and 3(*b*) are graphs schematically showing data representing a detected value $x_1$ by a light transmission sensor 11 for each of positions on a line L and data representing a detected value $x_2$ by a magnetic sensor 12 for each of the positions on the line L.
Figure 3:
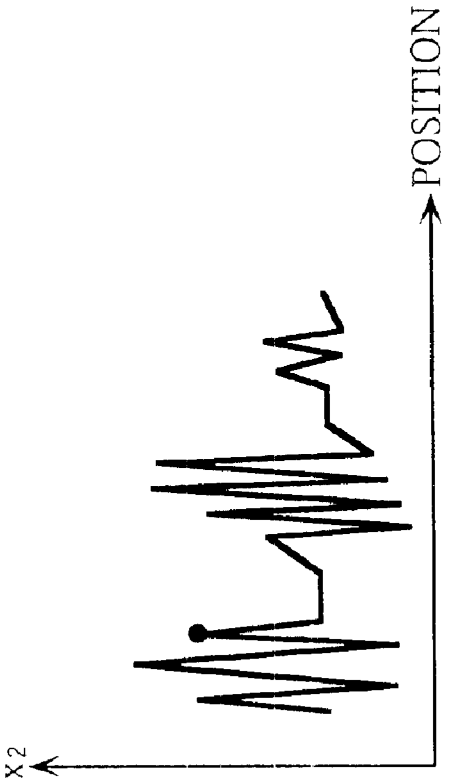

Consequently, data (FIG. 3(*a*)) representing the detected value $x_1$ by the light transmission sensor 11 for each of the positions on the line L and data (FIG. 3(*b*)) representing the detected value $x_2$ by the magnetic sensor 12 for each of the positions on the line L are obtained, as shown in FIGS. 3(*a*) and 3(*b*), with respect to one of the true bills.

(2) An equation of straight line $Z_1$ corresponding to a first principal component and an equation of straight line $Z_2$ corresponding to a second principal component are found from the data obtained with respect to all the true bills by a principal component analyzing method (step 2).

Specifically, a point graph is prepared using the detected value $x_1$ by the light transmission sensor 11 to enter the vertical axis and using the detected value $x_2$ by the magnetic sensor 12 to enter the horizontal axis as to the data ($x_1$, $x_2$) obtained for each of the positions on the line L with respect to all the true bills.

Such a first straight line (a $Z_1$ axis) that the sum of the squares of the lengths of perpendicular lines drawn from respective points out of straight lines passing through the center of gravity (an average) Q of the detected value $x_1$ by the light transmission sensor 11 and the detected value $x_2$ by the magnetic sensor 12 is the smallest is drawn. Further, a second straight line (a $Z_2$ axis) passing through the center of gravity Q and perpendicular to the $Z_1$ axis is drawn.

$Z_1$ denotes a first principal component, and $Z_2$ denotes a second principal component. The first principal component represents the degree of magnetic ink, and the second principal component represents the quality of ink. The distance of each of the points from the center of gravity Q on the straight line $Z_1$ in FIG. 4 refers to a first principal component score. The distance of each of the points from the center of gravity Q on the straight line $Z_2$ in FIG. 4 refers to a second principal component score.

The first equation of straight line $Z_1$ and the second equation of straight line $Z_2$ which are expressed by the following equation (1) are found:

$$Z_1 = a_1 \cdot x_1 + b_1 \cdot x_2$$

$$Z_2 = a_2 \cdot x_1 + b_2 \cdot x_2 \quad (1)$$

A method of finding coefficients at, $a_2$, $b_1$, and $b_2$ are well-known and hence, is omitted.

(3) Data representing the first principal component score for each of the positions on the line L and data representing the second principal component score for each of the positions on the line L are then produced for each of the true bills (step 3)

A method of producing the data representing the first principal component score for each of the positions on the line L and the data representing the second principal component score for each of the positions on the line L with respect to one of the true bills will be described.

Figure 4:
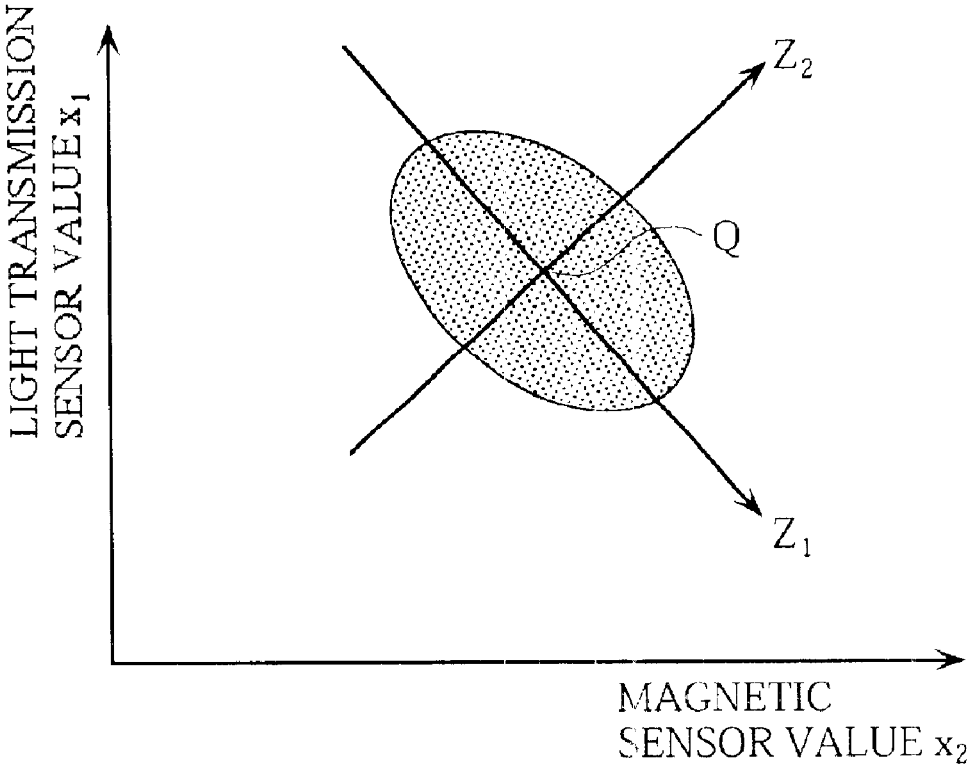
FIG. 4 is a graph for explaining a method of analyzing principal components.

Data ($x_1$, $x_2$) for each of the positions on the line L with respect to one arbitrary true bill in FIG. 4 is converted into a value in a system of coordinates formed by the Z axis and the $Z_2$ axis with the center of gravity Q at the origin. In other words, a first principal component score and a second principal component score represented by the data ($x_1$, $x_2$) for each of the positions on the line L with respect to one arbitrary true bill in FIG. 4 are found.

Specifically, the data ($x_1$, $x_2$) for each of the positions on the line L with respect to the one true bill is first substituted in the equation 1, to find values of $Z_1$ and $Z_2$ for the position on the line L. An average $*Z_1$ of $Z_1$ obtained for the positions on the line L and an average $*Z_2$ of $Z_2$ obtained for the positions on the line L are found. The average $*Z_1$ is subtracted from $Z_1$ obtained for each of the positions on the line L, to find a first principal component score for the position on the line L. Further, the average $*Z_2$ is subtracted from $Z_2$ obtained for each of the positions on the line L, to find a second principal component score for the position on the line L.

Figure 5:
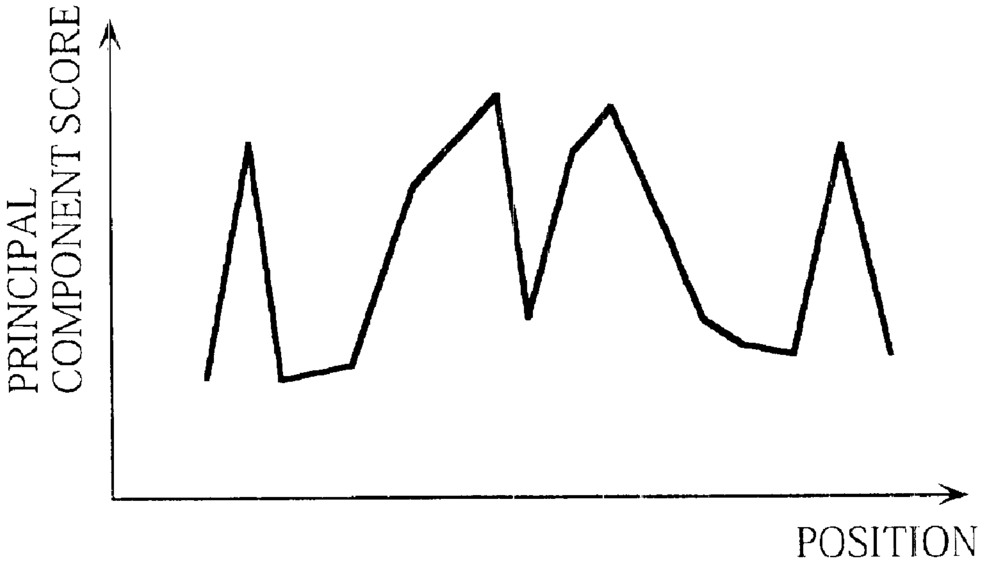
FIG. 5 is a graph schematically showing reference data relating to a first principal component.

Consequently, data representing the first principal component score for each of the positions on the line L and data representing the second principal component score for each of the positions on the line L are produced with respect to the true (4) An average of the first principal component scores with respect to all the true bills is found for each of the positions on the line L, thereby producing data representing the average of the first principal component scores for the position on the line L (step 4). Consequently, reference data relating to the first principal component is produced, as shown in FIG. 5, for example.

(5) Furthermore, an average of the second principal component scores with respect to all the true bills is found for each of the positions on the line L, thereby producing data representing the average of the second principal component scores for the position on the line L (step 5). Consequently, reference data relating to the second principal component is produced.

[1-3] Description of Method of Judging Truth of Bill to be Examined

Figure 6:
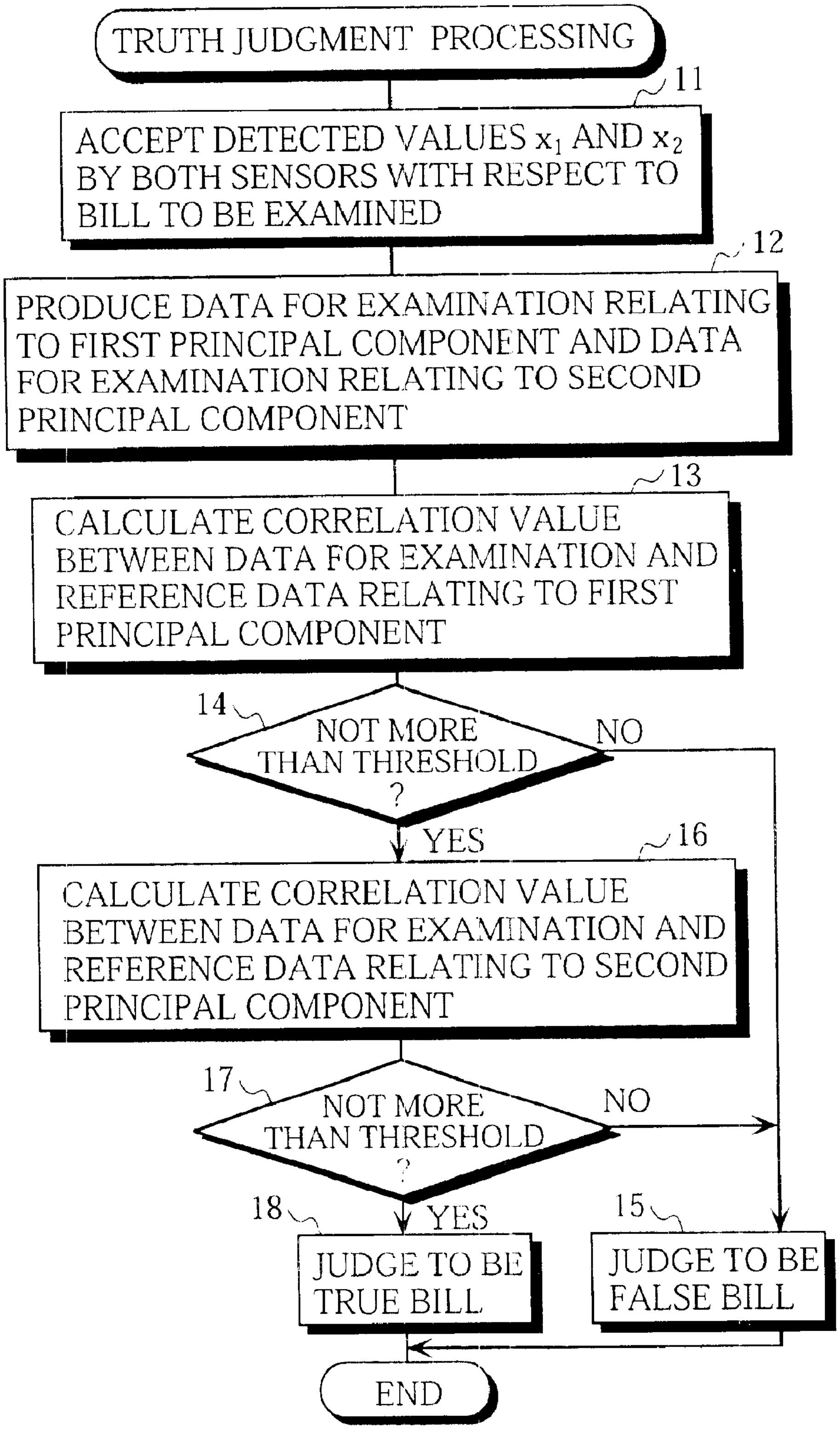
FIG. 6 is a flow chart showing the procedure for truth judgment processing of a bill to be examined.

FIG. 6 shows the procedure for truth judgment processing of a bill to be examined.

(1) With respect to a bill to be examined, a detected value $x_1$ by the light transmission sensor 11 and a detected value $x_2$ by the magnetic sensor 12 are accepted for each of a plurality of positions where characteristic amounts are read on a line L (step 11)

Consequently, data representing the detected value $x_1$ by the light transmission sensor 11 for each of the positions on the line L and data representing the detected value $x_2$ by the magnetic sensor 12 for each of the positions on the line L are obtained with respect to the bill to be examined.

(2) With respect to the bill to be examined, data representing a first principal component score for each of the positions on the line L (data for examination relating to a first principal component) and data representing a second principal component score for each of the positions on the line L (data for examination relating to a second principal component) are produced (step 12).

Data ($x_1$, $x_2$) for each of the positions on the line L with respect to the bill to be examined is first substituted in the equations of straight line Z, and $Z_2$ (the above-mentioned equation 1) found in the preliminary processing, to find values of $Z_1$ and $Z_2$ for the position on the line L. An average $*Z_1$ of $Z_1$ obtained for the positions on the line L and an average $*Z_2$ of $Z_2$ obtained for the positions on the line L are found. The average $*Z_1$ is subtracted from $Z_2$ obtained for each of the positions on the line L, to find a first principal component score for the position on the line L. Further, the average $*Z_2$ is subtracted from $Z_2$ obtained for each of the positions on the line L, to find a second principal component score for the position on the line L.

Consequently, data for examination relating to the first principal component (data representing the first principal component score for each of the positions on the line L) and data for examination relating to the second principal component (data representing the second principal component score for each of the positions on the line L) are produced with respect to the bill to be examined.

(3) A correlation value (a correlation value relating to the first principal component) between the data for examination relating to the first principal component found from the bill to be examined and reference data relating to the first principal component found by the preliminary processing is calculated (step 13). That is, the square of the difference between data values at the same position for examination of the data for examination relating to the first principal component found from the bill to be examined and the reference data relating to the first principal component is calculated, and the sum of the squares of the differences at the obtained positions for examination is then calculated. The result of the calculation is a correlation value relating to the first principal component.

(4) The correlation value relating to the first principal component and a predetermined threshold are compared with each other (step 14).

(5) When the correlation value relating to the first principal component is more than the predetermined threshold, the bill to be examined is judged to be a false bill (step 15).

(6) When the correlation value relating to the first principal component is not more than the predetermined threshold, a correlation value (a correlation value relating to the second principal component) between the data for examination relating to the second principal component found from the bill to be examined and reference data relating to the second principal component found by the preliminary processing is calculated (step 16). That is, the square of the difference between data values at the same position for examination of the data for examination relating to the second principal component found from the bill to be examined and the reference data relating to the second principal component is calculated, and the sum of the squares of the differences at the obtained positions for examination is then calculated. The result of the calculation is a correlation value relating to the second principal component.

(7) The correlation value relating to the second principal component and a predetermined threshold are compared with each other (step 17).

(8) When the correlation value relating to the second principal component is more than the predetermined threshold, the bill to be examined is judged to be a false bill step 15.

(9) When the correlation value relating to the second principal component is not more than the predetermined threshold, the bill to be examined is judged to be a true bill (step 18).

Although in the above-mentioned first embodiment, the reference data relating to each of the principal components is found by finding an average of the principal component scores with respect to all the true bills for each of the positions on the line L, an average of values of principal components (values of Z) for each of the positions on the line L with respect to all the true bills may be found to produce reference data relating to the principal components.

The reference data relating to the first principal component will be described. At the step 3 shown in FIG. 2, the data ($x_1$, $x_2$) for each of the positions on the line L is substituted in the equation 1 with respect to each of the true bills, to find the value of $Z_1$ for the position on the line L. At the step 4 shown in FIG. 2, an average of the values of $Z_1$ with respect to all the true bills is found for each of the positions on the line L, thereby producing reference data relating to the first principal component.

When the reference data is used, used as data for examination relating to each of the principal components is data composed of the value of the principal component for each of the positions on the line L with respect to the bill to be examined.

Description is made of the data for examination relating to the first principal component. At the step 12 shown in FIG. 6, the data ($x_1$, $x_2$) for each of the positions on the line L with respect to the bill to be examined is substituted in the equation of straight line $Z_1$ (the above-mentioned equation 1) found in the preliminary processing, to find the value of $Z_1$ for the position on the line L, thereby producing the data for examination relating to the first principal component.

[2] Description of Second Embodiment

[2-1] Description of Sensor for Reading Characteristic Amounts of Bill

Figure 7:
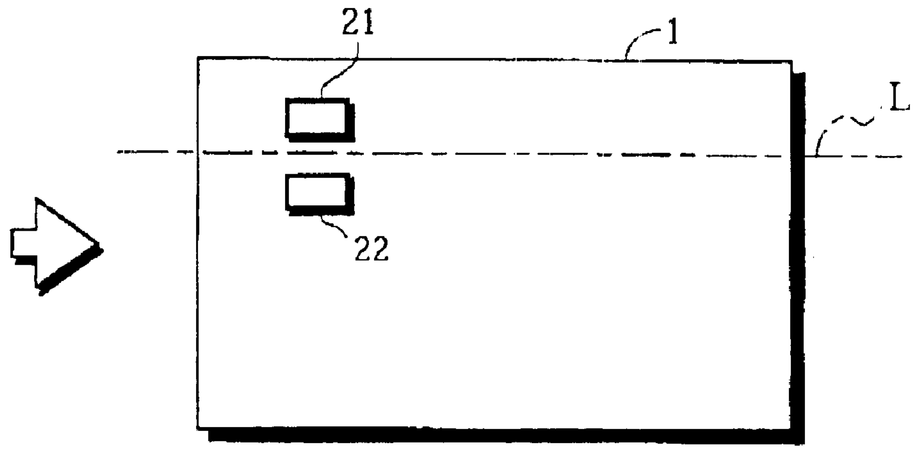
FIG. 7 is a plan view showing a sensor for reading characteristic amounts of a bill.
Figure 8:
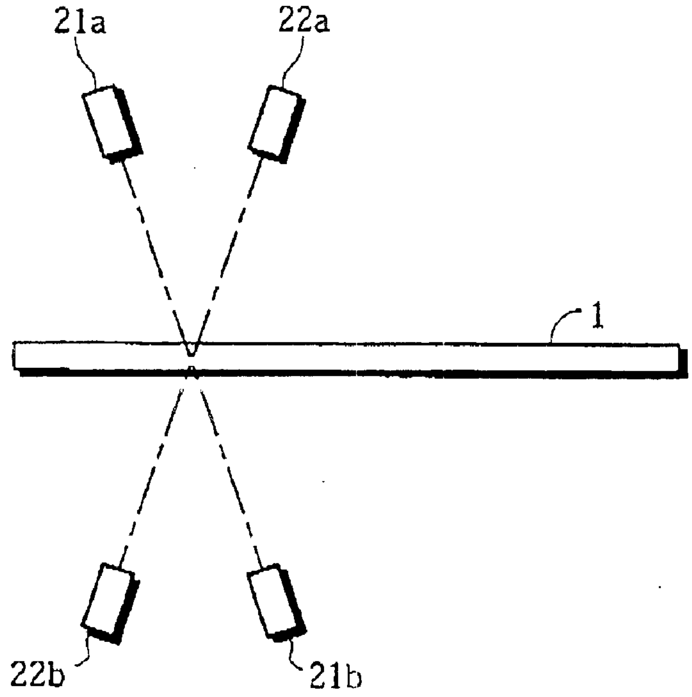
FIG. 8 is a front view showing a sensor for reading characteristic amounts of a bill.

FIGS. 7 and 8 illustrate a sensor for reading characteristic amounts of a bill.

A bill 1 is fed into an examining device (not shown) and is conveyed in a direction indicated by an arrow. As a sensor for reading characteristic amounts of the bill 1, a first light transmission sensor 21 and a second light transmission sensor 22 are provided.

The light transmission sensor 21 is constituted by a light emitting diode 21*a* for irradiating red light having a wavelength λ of 655 nm onto a plurality of positions where characteristic amounts are read on a surface of a bill 1 and on a line L and a photosensor 21*b* for receiving infrared light emitted from the light emitting diode 21*a* and passing through the bill 1.

The second light transmission sensor 22 is constituted by a light emitting diode 22*a* for irradiating infrared light having a wavelength λ of 840 nm onto the plurality of positions where characteristic amounts are read on the surface of the bill 1 and on the line L and a photosensor 22*b* for receiving red light emitted from the light emitting diode 22*a* and passing through the bill 1.

The light emitting diode 21*a* and the light emitting diode 22*a* are alternately driven, thereby obtaining outputs of both the photosensors 21*b* and 22*b* at each of the positions where characteristic amounts are read on the line L in the bill 1.

[2-2] Description of Preliminary Processing

In order to judge the truth of a bill, reference data must be produced on the basis of a plurality of true bills previously prepared.

Figure 9:
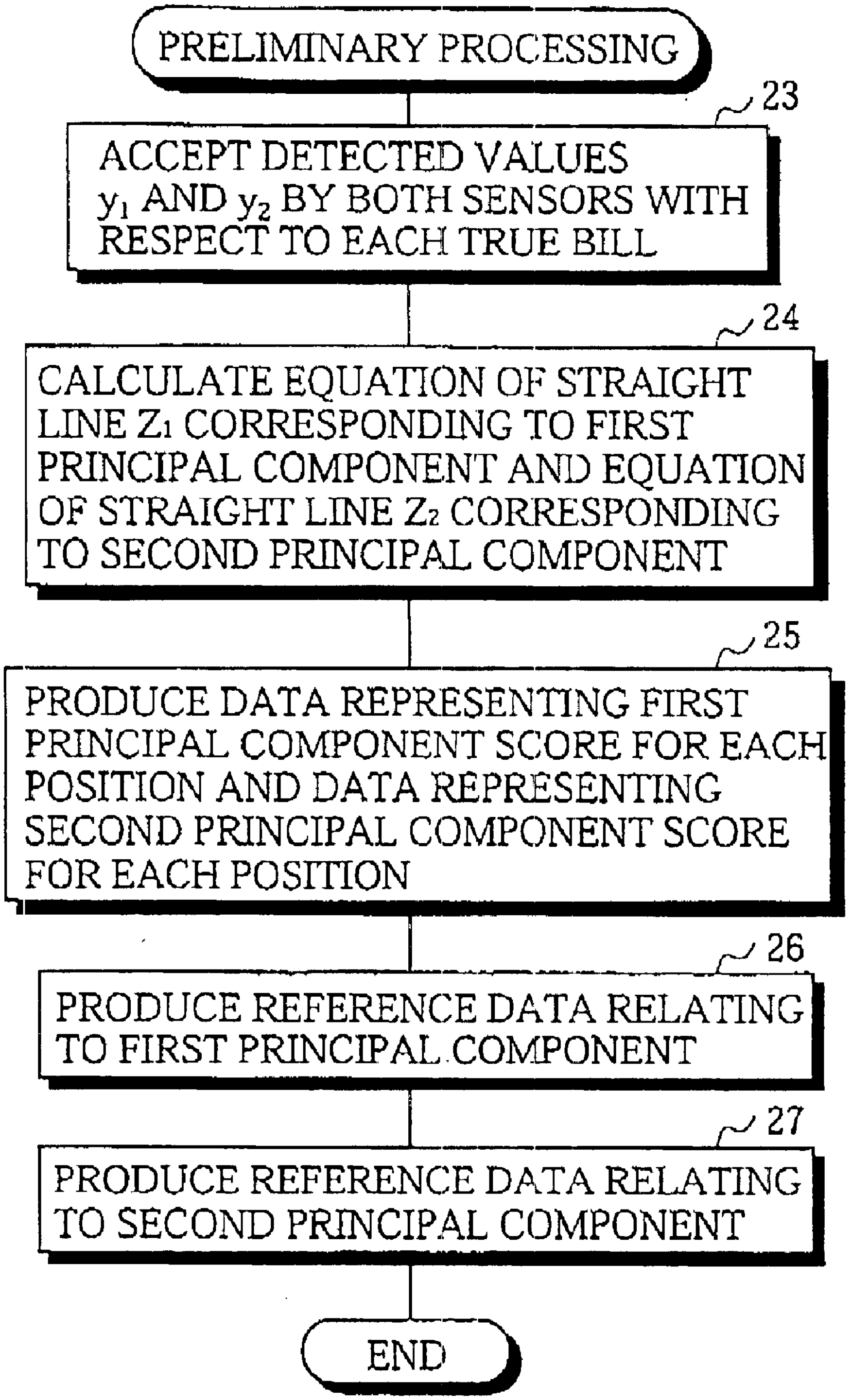
FIG. 9 is a flow chart showing the procedure for preliminary processing for producing reference data.

FIG. 9 shows the procedure for preliminary processing for producing reference data.

(1) A plurality of true bills are previously prepared. With respect to each of the true bills, a detected value $y_1$ by the first light transmission sensor 21 and a detected value $y_2$ by the second light transmission sensor 22 are accepted for each of a plurality of positions where characteristic amounts are read on a line L (step 23).

Figure 10:
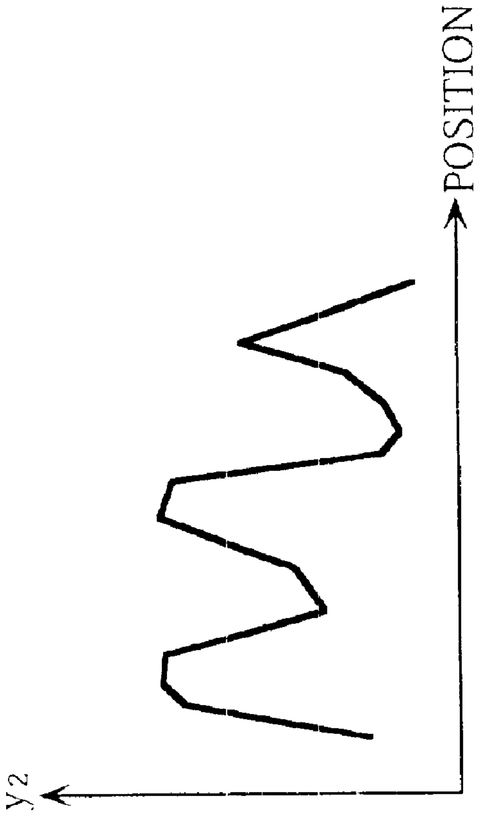
FIGS. 10(*a*) and 10(*b*) are graphs schematically showing data representing a detected value $y_1$ by a first light transmission sensor 21 for each of positions on a line L and data representing a detected value $y_2$ by a second light transmission sensor 22 for each of the position on the line L.
Figure 10:
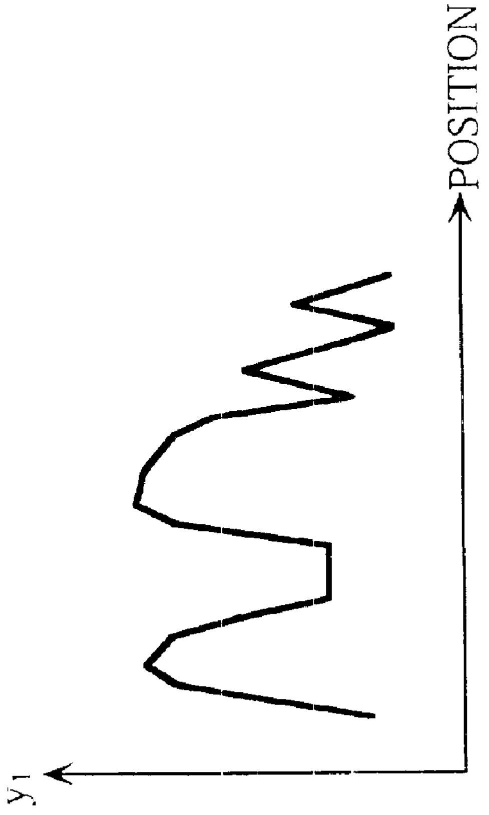

Consequently, data (FIG. 10(*a*)) representing the detected value $y_1$ by the first light transmission sensor 21 for each of the positions on the line L and data (FIG. 10(*b*)) representing the detected value $y_2$ by the second light transmission sensor 22 for each of the positions on the line L are obtained, as shown in FIGS. 10(*a*) and 10(*b*), with respect to one of the true bills.

(2) An equation of straight line $Z_1$ corresponding to a first principal component and an equation of straight line $Z_2$ corresponding to a second principal component are found from the data obtained with respect to all the true bills by a principal component analyzing method (step 24).

Specifically, a point graph is prepared using the detected value $y_1$ by the first light transmission sensor 21 to enter the vertical axis and using the detected value $y_2$ by the second light transmission sensor 22 to enter the horizontal axis as to the data ($y_1$, $y_2$) obtained for each of the positions on the line L with respect to all the true bills.

Such a first straight line (a $Z_1$ axis) that the sum of the squares of the lengths of perpendicular lines drawn from respective points out of straight lines passing through the center of gravity (an average) Q of the detected value $y_1$ by the first light transmission sensor 21 and the detected value $y_2$ by the second light transmission sensor 22 is the smallest is drawn. Further, a second straight line (a $Z_2$ axis) passing through the center of gravity Q and perpendicular to the $Z_1$ axis is drawn.

Figure 11:
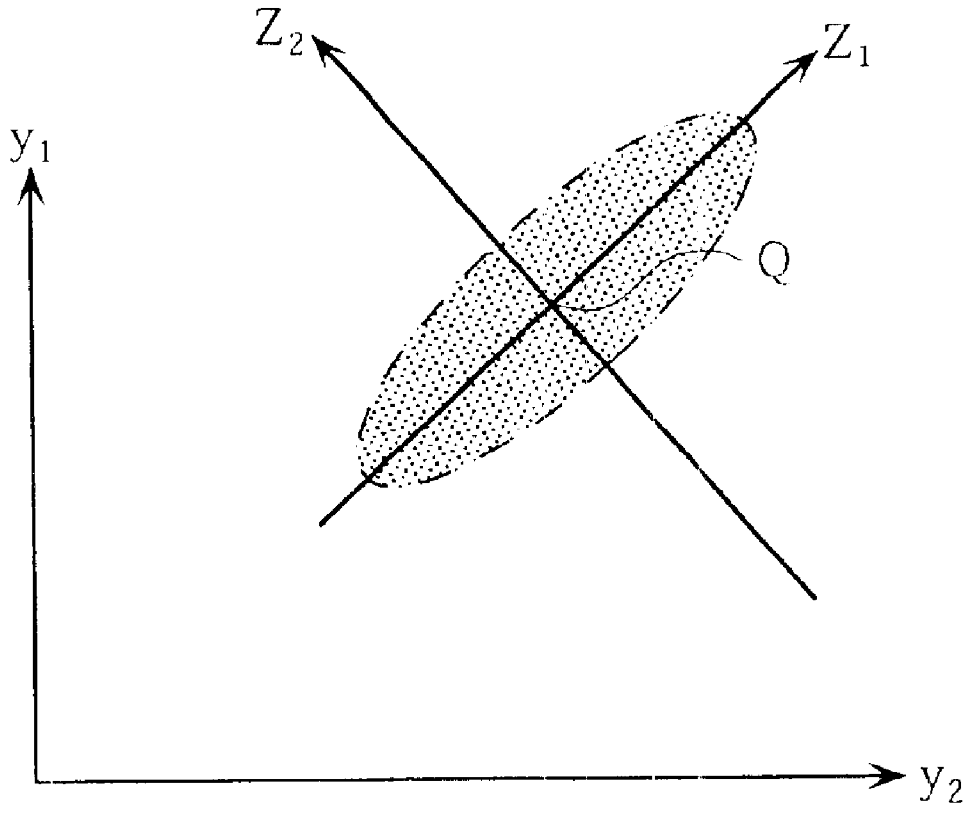
FIG. 11 is a graph for explaining a method of analyzing principal components.

$Z_1$ denotes a first principal component, and $Z_2$ denotes a second principal component. The first principal component represents the gradation of ink, and the second principal component represents the quality of ink. The distance of each of the points from the center of gravity Q on the straight line $Z_1$ in FIG. 11 refers to a first principal component score. The distance of each of the points from the center of gravity Q on the straight line $Z_2$ in FIG. 11 refers to a second principal component score.

The first equation of straight line $Z_1$ and the second equation of straight line $Z_2$ which are expressed by the following equation (2) are found:

$$Z_1=a_1\cdot y_1+b_1\cdot y_2$$

$$Z_2=a_2\cdot y_1+b_2\cdot y_2 \quad (2)$$

A method of finding coefficients $a_1$, $a_2$, $b_1$, and $b_2$ are well-known and hence, is omitted.

(3) Data representing the first principal component score for each of the positions on the line L and data representing the second principal component score for each of the positions on the line L are then produced for each of the true bills (step 25). A method for producing the data is the same method as that at the step 3 shown in FIG. 2 in the first embodiment and hence, the description thereof is not repeated.

(4) An average of the first principal component scores with respect to all the true bills is found for each of the positions on the line L, thereby producing data representing the average of the first principal component scores for the position on the line L (step 26). Consequently, reference data relating to the first principal component is produced.

(5) Furthermore, an average of the second principal component scores with respect to all the true bills is found for each of the positions on the line L, thereby producing data representing the average of the second principal component scores for the position on the line L (step 27). Consequently, reference data relating to the second principal component is produced.

[2-3] Description of Method of Judging Truth of Bill to be Examined

Figure 12:
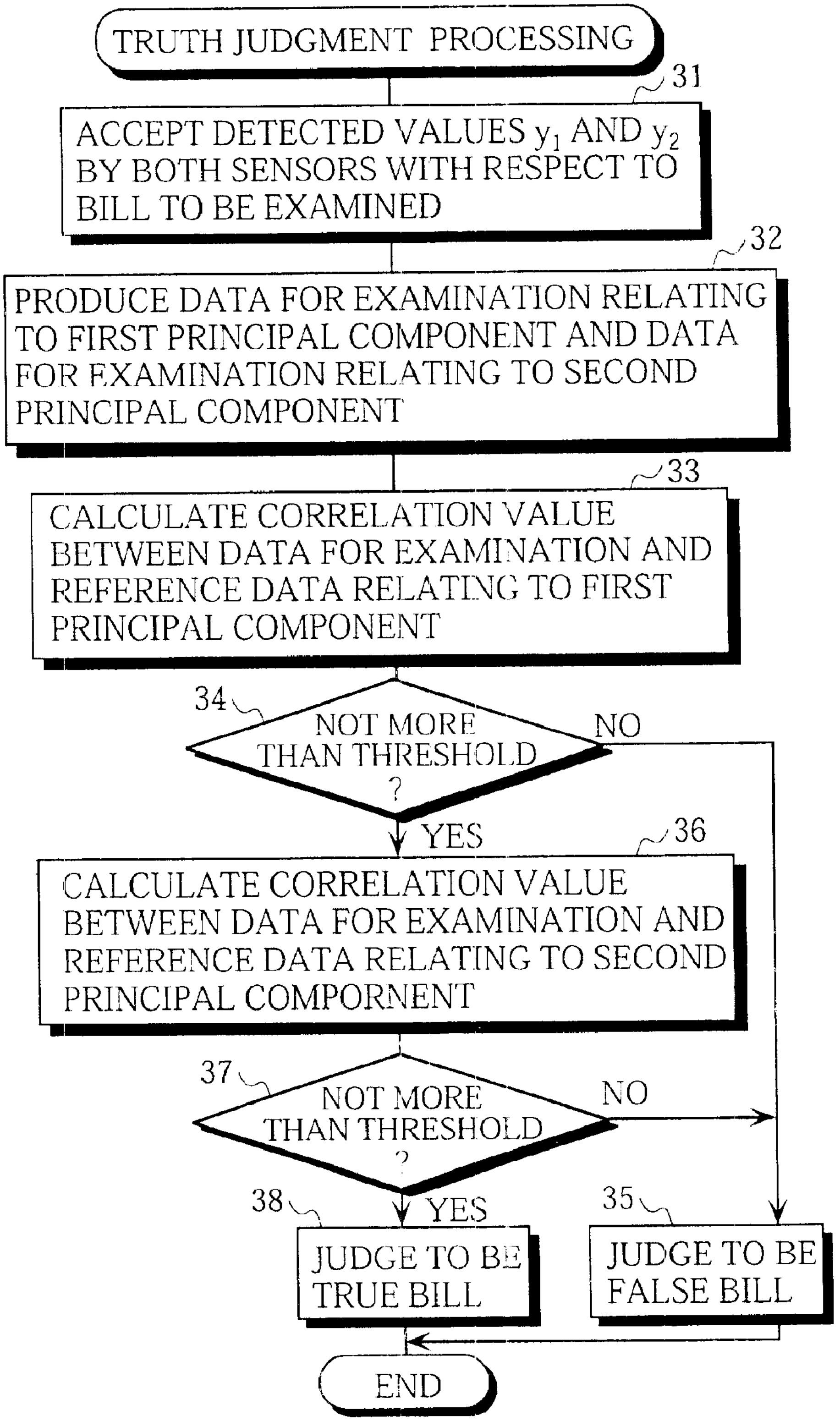
FIG. 12 is a flow chart showing the procedure for truth judgment processing of a bill to be examined.

FIG. 12 shows the procedure for truth judgment processing of a bill to be examined.

(1) With respect to a bill to be examined, a detected value $y_1$ by the first light transmission sensor 21 and a detected value $y_2$ by the second light transmission sensor 22 are accepted for each of a plurality of positions where characteristic amounts are read on a line L (step 31).

Consequently, data representing the detected value $y_1$ by the first light transmission sensor 21 for each of the positions on the line L and data representing the detected value $y_2$ by the second light transmission sensor 22 for each of the positions on the line L are obtained with respect to the bill to be examined.

(2) With respect to the bill to be examined, data representing a first principal component score for each of the positions on the line L (data for examination relating to a first principal component) and data representing a second principal component score for each of the positions on the line L (data for examination relating to a second principal component) are produced (step 32). A method of producing the data is the same as that at the step 12 shown in FIG. 2 in the first embodiment and hence, the description thereof is not repeated.

(3) A correlation value (a correlation value relating to the first principal component) between the data for examination relating to the first principal component found from the bill to be examined and reference data relating to the first principal component found by the preliminary processing is calculated (step 33). That is, the square of the difference between data values at the same position for examination of the data for examination relating to the first principal component found from the bill to be examined and the reference data relating to the first principal component is calculated, and the sum of the squares of the differences at the obtained positions for examination is then calculated. The result of the calculation is a correlation value relating to the first principal component.

(4) The correlation value relating to the first principal component and a predetermined threshold are compared with each other (step 34).

(5) When the correlation value relating to the first principal component is more than the predetermined threshold, the bill to be examined is judged to be a false bill (step 35).

(6) When the correlation value relating to the first principal component is not more than the predetermined threshold, a correlation value (a correlation value relating to the second principal component) between the data for examination relating to the second principal component found from the bill to be examined and reference data relating to the second principal component found by the preliminary processing is calculated (step 36). That is, the square of the difference between data values at the same position for examination of the data for examination relating to the second principal component found from the bill to be examined and the reference data relating to the second principal component is calculated, and the sum of the squares of the differences at the obtained position for examination is then calculated. The result of the calculation is a correlation value relating to the second principal component.

(7) The correlation value relating to the second principal component and a predetermined threshold are compared with each other (step 37).

(8) When the correlation value relating to the second principal component is more than the predetermined threshold, the bill to be examined is judged to be a false bill (step 35).

(9) When the correlation value relating to the second principal component is not more than the predetermined threshold, the bill to be examined is judged to be a true bill (step 38).

Also in the above-mentioned second embodiment, an average of values of principal components (values of Z) with respect to all the true bills for each of the positions on the line L may be found to produce reference data relating to the principal components. When the reference data is used, used as data for examination relating to each of the principal components is data composed of the value of the principal component (the value of Z) for each of the positions on the line L with respect to the bill to be examined.

[3] Description of Another Embodiment

Although in the first embodiment and the second embodiment, the truth of the bill is judged using two types of sensors, the truth of the bill can be also judged using three types of sensors.

Figure 13:
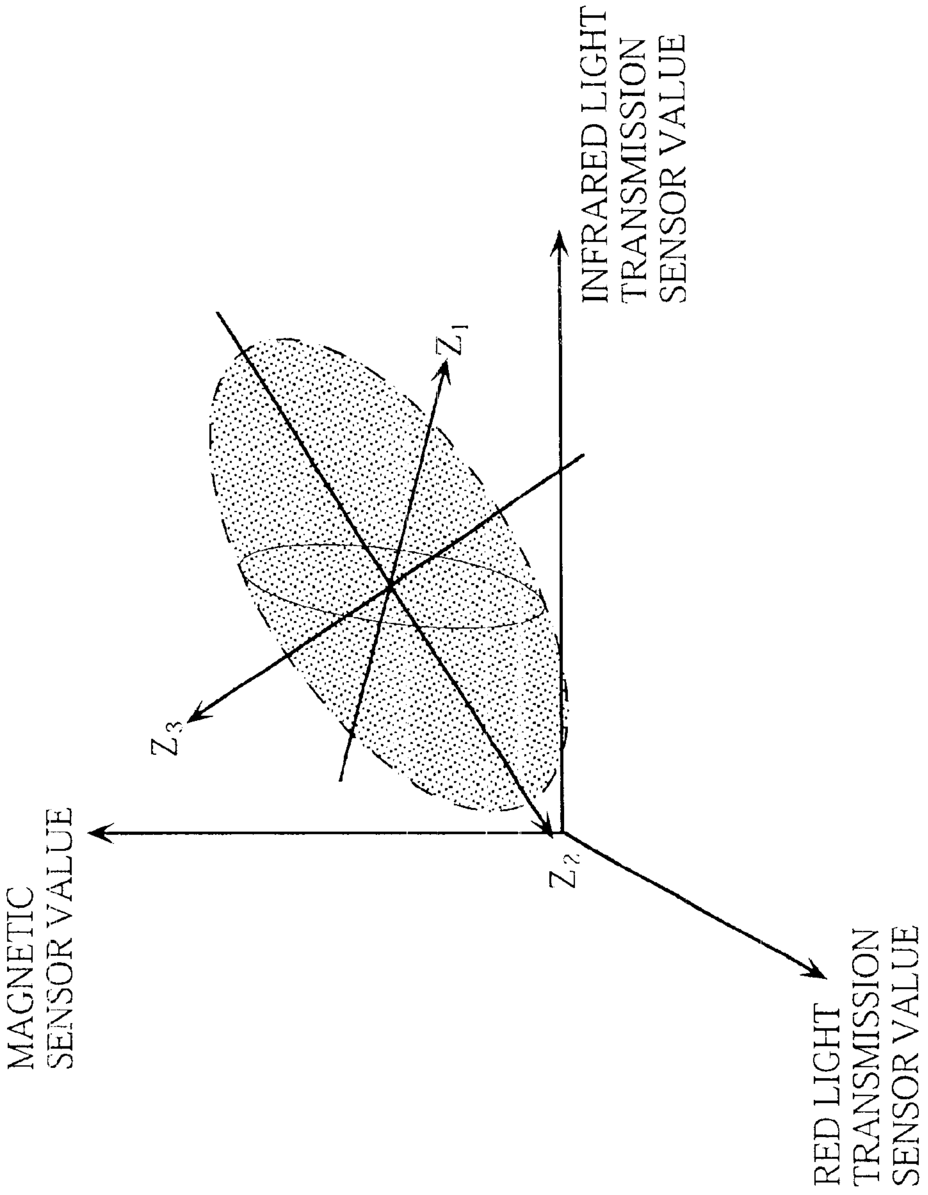
FIG. 13 is a graph for explaining a method of analyzing principal components.

An example using a magnetic sensor, an infrared light transmission sensor (a first light transmission sensor), a read light transmission sensor (a second light transmission sensor), for example, will be briefly described. When the three types of sensors are used, three principal components $Z_1$, $Z_2$, and $Z_3$ which are perpendicular to one another are found by a principal component analyzing method, as shown in FIG. 13. The principal component $z_1$ represents the gradation of ink, the principal component $z_2$ represents the quality of ink (an optical element), and the principal component $Z_3$ represents the quality of ink (a magnetic element).

In preliminary processing, three types of sensor values (an infrared light transmission sensor value, a read light transmission sensor value, and a magnetic sensor value) for each of positions on a line L are measured from a plurality of true bills, to produce reference data for each of the principal components $Z_1$, $Z_2$, and $Z_3$ (data representing an average of principal component scores or values of Z for each of the positions on the line L) from the measured values.

In truth judgment processing of the bill to be examined, three types of sensor values (an infrared light transmission sensor value, a red light transmission sensor value, and a magnetic sensor value) for each of the positions on the line L are measured from the bill to be examined, to calculate data for examination (data representing the principal component score or the value of Z for the position on the line L) for each of the principal components $Z_1$, $Z_2$, and $Z_3$ from the measured values.

A correlation value between the data for examination obtained from the bill to be examined and the reference data is calculated for each of the principal components, and the obtained correlation value and a predetermined threshold are compared with each other, to judge the truth of the bill to be examined.

According to the present invention, a method of judging the truth of a paper type which is difficult to counterfeit is obtained.

What is claimed is:

1. A method of judging the truth of a paper type, comprising the steps of:

measuring, with respect to each of true paper types previously prepared, a plurality of types of characteristic amounts by a plurality of types of sensors for each of a plurality of portions for examination previously determined, analyzing principal components on the basis of obtained results of the measurement, to find an equation of a straight line corresponding to a predetermined principal component, wherein the equation of the straight line for the predetermined principal component is calculated through a sum of squares of the obtained results, and producing reference data composed of a value relating to the predetermined principal component for the portion for examination on the basis of the found equation of straight line;

measuring, with respect to the paper type to be examined, the plurality of types of characteristic amounts by the plurality of types of sensors for each of the plurality of portions for examination previously determined, and producing data for examination composed of a value relating to the predetermined principal component for the position for examination on the basis of obtained results of the measurement and said equation of straight line; and comparing the reference data and the data for examination, to judge the truth of the paper type to be examined.

2. The method according to claim 1, wherein two types of sensors, that is, a magnetic sensor and a light sensor are used as the plurality of types of sensors.

3. The method according to claim 1, wherein two types of sensors, that is, a red light sensor and an infrared light sensor are used as the plurality of types of sensors.

4. The method according to claim 1, wherein three types of sensors, that is, a magnetic sensor, a red light sensor, and an infrared light sensor are used as the plurality of types of sensors.

* * * * *